(12) United States Patent
Ketzer et al.

(10) Patent No.: US 11,996,590 B2
(45) Date of Patent: May 28, 2024

(54) HYBRID GAS DIFFUSION LAYER FOR ELECTROCHEMICAL CELLS

(71) Applicant: JOHNS MANVILLE, Denver, CO (US)

(72) Inventors: Michael Ketzer, Collenberg (DE); Klaus Friedrich Gleich, Nurenberg (DE)

(73) Assignee: Johns Manville, Denver, CO (US)

( * ) Notice: Subject to any disclaimer, the term of this patent is extended or adjusted under 35 U.S.C. 154(b) by 340 days.

(21) Appl. No.: 17/292,260

(22) PCT Filed: Nov. 28, 2019

(86) PCT No.: PCT/EP2019/082932
§ 371 (c)(1),
(2) Date: May 7, 2021

(87) PCT Pub. No.: WO2020/120154
PCT Pub. Date: Jun. 18, 2020

(65) Prior Publication Data
US 2022/0123327 A1    Apr. 21, 2022

(30) Foreign Application Priority Data
Dec. 14, 2018 (DE) .................. 10 2018 009 747.2

(51) Int. Cl.
*H01M 8/0245* (2016.01)
*H01M 8/0234* (2016.01)
*H01M 8/0236* (2016.01)
*H01M 8/10* (2016.01)

(52) U.S. Cl.
CPC ....... *H01M 8/0245* (2013.01); *H01M 8/0234* (2013.01); *H01M 8/0236* (2013.01); *H01M 2008/1095* (2013.01)

(58) Field of Classification Search
None
See application file for complete search history.

(56) References Cited

U.S. PATENT DOCUMENTS

| 6,083,638 A * | 7/2000 | Taniguchi | H01M 8/0247 429/513 |
| 2008/0318116 A1 * | 12/2008 | Kimura | H01M 8/0243 429/502 |
| 2019/0051877 A1 * | 2/2019 | Noda | H01M 8/1058 |

\* cited by examiner

*Primary Examiner* — Alix E Eggerding
(74) *Attorney, Agent, or Firm* — Robert D. Touslee

(57) ABSTRACT

The present invention relates to hybrid gas diffusion layers for electrochemical cells, in particular for membrane electrode units in polymer electrolyte membrane (PEM) fuel cells and a method for manufacturing them.

24 Claims, No Drawings

HYBRID GAS DIFFUSION LAYER FOR ELECTROCHEMICAL CELLS

BACKGROUND OF THE INVENTION

The present invention relates to hybrid gas diffusion layers for electrochemical cells; in particular, for membrane electrode units in polymer electrolyte membrane (PEM) fuel cells and a method for manufacturing them.

Polymer electrolyte membrane (PEM) fuel cells today use nearly exclusively sulfonic acid-modified polymers as proton-conducting membranes. At the same time, perfluored polymers are used for this. A prominent example of this is Nafion® of DuPont de Nemours, Wilmington, USA, or the membranes made by the company Asahi, Japan. For conducting protons, a relatively high concentration of water is required in the membranes, which is typically around 4 to 20 molecules of water per sulfonic acid group. Not only the required water concentration, but also the stability of the polymer in the bond with acidic water and the reagent gases hydrogen and oxygen limits the operating temperature of the PEM fuel cell stack to a range between approx. 80 to 100° C. Higher working temperatures cannot be realized with these membranes without a loss of performance of the fuel cell. For temperatures that have a given pressure level above the dew point of water, the membrane dries out completely and the fuel cell stops delivering electrical energy, since the resistance of the membrane rises to such high values that no mentionable current flow takes place anymore.

The polymer electrolyte membrane (PEM) fuel cells described above, which are based on sulfonic acid-modified polymers are also referred to as "low temperature" PEM fuel calls, as these require that water molecules are present before they become conductive and because they can normally be operated only up to a working temperature of max. 100° C. (normal pressure).

For reasons of systems engineering, however, also a working temperature higher than 100° C. can be desirable in a fuel cell. On the one hand, the activity of the catalysts on precious metal basis, which are contained in the membrane electrode unit (MEU), is significantly improved in high working temperatures while, at the same time, higher working temperatures (min. 100° C.) permit the use of so-called hydrocarbon reformates. The carbon monoxide concentrations contained in the hydrogenous reformate gas usually have to be removed through an elaborate gas conditioning or gas cleaning process, which, however, is not necessary in high working temperatures (120 to 200° C.), as the tolerance of the catalysts for the CO contaminations rises. To reach working temperatures of 120 to 200° C. or 160 to 180° C., generally membranes with new conductivity mechanisms, e.g. the Grotthus mechanism, are used. Such systems are also referred to as "high temperature" PEM fuel cells and these are based on phosphoric acid as electrolyte, which is present as a non-covalent bond in a matrix or basic polymer. This type of membrane is described in depth, for example, in DE 10 2005 038195.

For the operation of a polymer electrolyte membrane (PEM) fuel cell, an added hydrogen together with air oxygen is converted into electrical energy. For this, the reaction gases ($H_2$, $O_2$) are distributed over a gas distribution structure, which frequently comprises a metal surface that is provided with channel structures, distributed extensively across the active surface of the electrochemical converter. So that the gases are distributed as evenly as possible, a gas diffusion layer (GDL) is inserted between the gas distribution structure and the catalyst layer. The proton exchange membrane, which is permeable for protons, acts as a separator between the electrodes and also separates the reaction gases.

The sole waste product created in the electrochemical conversion of the reaction gases is water. Since the PEM fuel cells are operated in particular when starting or stopping within a temperature range below 100° C., a significant part of the product water can also accumulate in liquid form or condense due to the prevalent conditions of partial vapor pressure and the resulting dew points. To prevent that the gas transport by the product water from is blocked, the gas diffusion layer must additionally assure an effective removal of liquid water without its pores being blocked by water (electrode flooding).

The gas diffusion layer (GDL) thus represents a core component of a polymer electrolyte membrane (PEM) fuel cell. In this context, extensively, electrically conductive and acid-resistant structures are used as gas diffusion layers, such as graphite papers, carbon fiber papers, graphite fabrics and/or papers, which are made conductive by adding grime, and carbon fiber papers with carbon nanotube (CNT) on the surface and CNT paper. Normally, the GDL provides at least the following main functions:

a homogeneous distribution of gases across the active surface, assurance of the most even contact pressure distribution possible, also in the area of the gas channels, and thermal and electrical contacting of the catalyst layer.

The gas diffusion layer can also serve as a carrier for the catalyst layer and it should have a good mechanical firmness, easy access for the gas to the catalyst and sufficient electrically conductivity. It is particularly beneficial if a microporous layer (MPL) is arranged between the gas diffusion layer and the catalyst layer, e.g. see EP-A-2,869, 382. To achieve an effective transport of the water, the materials are coated with water-repellent, fluorinated polymers, mostly PTFE to prevent the condensation of water in the pores. On the side to the active surface, a microporous layer (MPL) comprising carbon grime and PTFE is applied on the GDL to improve the electrical connection and the transport of water. Literature also refers to these materials as (Carbon) Micro Porous Layers (C-MPL).

The catalyst layers are to contain catalytically active substances such as precious metals of the platinum group, i.e. Pd, Ir, Rh, Os, Ru, or also the precious metals Au and Ag. At the same time, the metals may be used, if necessary, on a carrier material such as carbon, in particular, in the form of grime, graphite or graphitized grime. It is additionally possible that the catalytically active layers include further additives such as fluoropolymers, in particular polytetrafluorethylene (PTFE), proton conducting ionomers and surface-active substances.

Such catalyst layers are usually produced using a catalyst ink, which contains a catalyst precious metal, e.g. platinum on a carrier material, e.g. grime, a binder and a hydrophobization agent, e.g. PTFE, a surfactant and a thickener, e.g. methylcellulose.

Gas diffusion layers for fuel cells are known from the publication of X. L. Wang et al. "Micro-porous layer with composite carbon black for PEM fuel cells", Electrochimica Acta 51 (2006) 4909-4915, which comprise a macroporous gas diffusion layer of carbon fiber paper or graphite fabric and a microporous layer. Here, the microporous layer is preserved by applying the grime and a hydrophobization agent on the top and bottom side of the macroporous gas diffusion layer. The application of the microporous layer is to provide the right pore structure and hydrophobicity in order to apply a catalyst layer onto the side facing the membrane, and to improve the gas transport and reach a better hydrophobicity of the catalyst layer, and to reduce the electrical contact resistance to the catalyst layer.

The gas diffusion layers are tested at 80° C. using a Nafion® membrane, which has been coated on the top and bottom side with a homogeneous perfluoro polymer (PF)/ C-mixture. Such systems, however, lead to problems and a reduction of output at working temperatures above 100° C., due to the small pores on the backside of the gas diffusion layer. Accordingly, especially the passing air permeability at 200 Pa according to the testing standard EN ISO9237 is less than 5 l/m²s.

Many publications on the topic of gas diffusion layers can be found in the prior art. A large number of publications has in common that these are based on gas diffusion layers made of carbon fiber mats. To reach the required electrical conductivity, numerous and complex tempering steps are needed to transfer the precursor materials based on polyacrylonitrile (PAN) into electrically conductive carbon fiber mats. These measures are very complex and require many individual steps, involving high costs for energy and production. Moreover, such materials tend to have a non-homogeneous surface structure. In particular, in the areas of the channels, the GDL surface is lowered, thus resulting in a non-homogeneous distribution of the contact pressure. Additional consequences are a reduction of the contact surface between the PEM and the electrode and a lowering of the current density that can be reached with it resulting in an overall loss of output.

The GDL materials used to date, mostly have a thicker structure, which can result in unwanted water deposits. The water transport properties are therefore impaired by this.

The commonly used GDL materials frequently also have to struggle with uneven surface structures due to protruding fibers, which can impair the function. An additional MPL is necessarily required in such cases.

Initial approaches to replacing gas diffusion layers made of carbon fiber mats by alternative materials are described, for example, in WO 1997/20358.

The gas diffusion electrode there described in a membrane electrode unit has a gas diffusion electrode, which comprises an electrically conductive, hydrophobic and gas-permeable gas diffusion layer, meanwhile the gas diffusion layer contains a mechanically stable support material, which is impregnated with an electrically conductive material and comprises glass fibers, carbonized fibers or polymer fibers as support material. Regarding electrical conductivity, the proposed system has significant deficits in terms of the required porosity and transport properties and in terms of the mechanical properties.

Additionally, DE-A-10 2010 052 997 discloses a diffusion medium, which is characterized by an electrically conductive layer of coated fibers. There, however, the problem of the adhesion on the fibers is an issue, as damage to the coating leads to a reduction—or even a complete loss—of the electrical conductivity.

BRIEF SUMMARY OF THE INVENTION

The problem to be solved by the present invention was therefore to provide gas diffusion layers (GDL), which not only meet the necessary requirements for the use in polymer electrolyte membrane (PEM) fuel cells, but which can also be manufactured in a simpler and more cost-efficient process. Moreover, the gas diffusion layer to be provided should also have good properties for transporting materials (water) and, in particular, prevent unwanted water accumulation. Apart from this, the solution according to the invention should have the further or additional characteristics:

the highest possible porosity (permeability) for the transport of gas to avoid mass transport losses;
efficient water discharge to avoid pore flooding and the related mass transport losses for gases;
very high electrical conductivity to reduce the ohmic losses and internal resistance;
very high thermal conductivity to protect against membrane overheating;
very high mechanical flexural stiffness with simultaneous compressibility to reach a homogeneous contact pressure distribution to the PEM;
very low thickness;
very smooth surface to prevent damage to the membrane from protruding fibers;
manufacturing method ready for series production;
environmentally compatible manufacturing, i.e. minimal energy consumption, avoidance of substances harmful to the environment;
low total production costs.

Accordingly, the object of the present invention is a gas diffusion layer (GDL), comprising
(i) a base carrier fiber mat (BFM), characterized in that
(ii) the base carrier mat (BFM) is a hybrid base carrier mat (H-BFM), and
(iii) the aforementioned hybrid base carrier mat (H-BFM) is provided with a high-porous conductive impregnation (HPCI), and
(iv) the aforementioned impregnated hybrid base carrier mat (H-BFM) may, if applicable, is provided with an additional microporous layer (MPL).

DETAILED DESCRIPTION OF THE INVENTION

Hybrid Base Carrier Mat (H-BFM)

As part of the present invention, the hybrid base carrier mat (H-BFM) means a mat with at least one electrically conductive and at least one electrically non-conductive component.

Electrically conductive fibers, electrically conductive additives or mixtures of electrically conductive fibers and electrically conductive additives are understood to mean electrically conductive components.

Electrically conductive fibers mean fibers with a preferable electrically conductivity of min. 100 S/m, more preferable min. $10^3$ S/m, most preferable min. $10^4$ S/m.

Electrically non-conductive components preferably mean fibers that do not have any measurable electrically conductivity, i.e. with an electrically conductivity of preferably max. $10^{-5}$ S/m, most preferably max. $10^{-8}$ S/m.

Preferred electrically conductive fibers are carbon fibers, in particular graphite fibers. Further usable electrically conductive fibers are metal fibers and electrically conductive polymer fibers.

Preferred electrically conductive additives are graphites and grimes (carbon black), which are added to the H-BTF together with a binder.

Preferred electrically non-conductive fibers are inorganic fibers, preferably glass fibers, ceramic fibers and/or mineral fibers or also mixtures of the same, which are used to at least partly replace the glass fibers. The used inorganic fibers, especially the glass fibers are discontinued fibers, i.e. so-called staple or cut fibers.

Suitable mineral and ceramic fibers are, for example, aluminosilicate, ceramic, dolomite wollastonite fibers or fibers of vulcanites, preferably basalt, diabas and/or melaphyre fibers, in particular basalt fibers. Diabase and melaphyre are referred to collectively as palaeobasalts and diabas is also often called greenstone.

Suitable glass fibers are such that have been made of A-glass, E-glass, C-glass, T-glass or R-glass.

E-glass fibers are used preferably. Besides increased durability in the operation of the fuel cell, the E-glass fibers have further advantages when it comes to heat conductivity. The fibers can also be unlayered to ensure the highest possible chemical purity.

The average length of the inorganic fibers, especially of the mineral fibers or glass fibers, is between 5 and 18 mm, preferably between 10 and 14 mm. The average fiber diameter of the inorganic fibers, especially of the mineral fibers or glass fibers, is between 5 and 30 μm, preferably between 6 and 16 μm, more preferably between 8 and 13 μm.

Besides the aforementioned electrically non-conductive inorganic fibers, also organic fibers, in particular polymer fibers or mixtures of organic and inorganic fibers can be used. The selection of suitable organic fiber materials is dependent on the required or resulting temperatures in the manufacturing process and the use of the H-BTF. Preferred polymer fiber materials, other than polyamides (PA) and polyethylene ketones are, for example, polyether ether ketone (PEEK), polyether ketone (PEK), polyether ketone (PEKK), polyether ether ketone ketone (PEEKK), as well as polyester, for example, polyethylene terephthalate (PET) or polyolefins, for example, polypropylene (PP). Organic fibers can be present as cut fibers, staple fibers or filaments.

The individual titers of the polymer filaments are between 1 and 16 dtex, preferably between 2 to 10 dtex. The individual titers of the staple fibers are between 1 and 16 dtex, preferably between 2 to 10 dtex. The staple length is 1 to 100 mm, preferably 2 to 50 mm, more preferably 2 to 30 mm.

Preferred electrically conductive fibers are graphite or carbon fibers. The graphite or carbon fibers have a diameter of 4 to 20 μm, a preferred diameter of 4 to 12 μm, and a length of 4 to 40 mm, a preferred length of 4 to 18 mm, more preferred a diameter of 5 to 9 μm and a length of 6 to 12 mm. Besides the electrically conductive graphite or carbon fibers or instead of the graphite or carbon fibers, also fibers of conductive polymers, such as polyaniline or also polymer fibers can be used, in particular, polyester of polypropylene fibers with conductive additives. Besides this, also fibers or filaments made of metal can be used. In a preferred embodiment, only graphite or carbon fibers are used besides the glass fibers.

The graphite or carbon fibers enable in particular to ensure a homogeneous conductivity of the BTF by bridging the gas channels.

The hybrid base carrier mat (H-BFM) is manufactured by means of known methods, preferably, the hybrid base carrier mat (H-BFM) is manufactured by means of known wet-laying process. Wet-laying processes of this kind are known from the prior art of the glass fiber mat technology. The wet-laying processes facilitate a good distribution of the various fibers, resulting in a bridging of the gas channels and a homogeneous conductivity of the H-BTF. Fleeces that are manufactured by means of the wet-laying process can be differentiated from dry-laid mats.

The hybrid base carrier mat (H-BFM) according to the invention preferably contains 5 to 70 weight-%, more preferably 20 to 60 weight-% electrically conductive fibers, and preferably 95 to 30 weight-%, more preferably 80 to 40 weight-% electrically non-conductive fibers. The aforementioned weight-% indications refer to the total weight of all present fibers without consideration of any possibly present binders or other additives such as sizing agents.

The hybrid base carrier mat (H-BFM) according to the invention may have a further reinforcement in addition. Such reinforcements improve the contact pressure behavior of the gas diffusion layer on the gas distribution structure, whereby the reaction and flue gases can be added and extracted, and on the proton conductive polymer electrolyte membrane (PEM).

The aforementioned reinforcements are preferably reinforcement filaments and/or yarns with a Young module of at least 5 Gpa, preferably at least 10 Gpa, more preferably at least 20 GPa. The reinforcement filaments, i.e. both the monofils, rovings or yarns have a diameter between 0.1 and 1 mm or 10 to 2400 tex, preferably 0.1 and 0.5 mm, more preferably 0.1 and 0.3 mm, with an elongation at fracture of 0.5 to 100%, preferably 1 to 60%.

Filaments, in particular multi-filaments and/or monofilaments on a carbon, glass, glass fiber rovings, mineral fiber basis (basalt) or wire (mono-filaments) made of metals or metal alloys are preferred for use as reinforcements. Preferred reinforcements consist of multifilament glass in the—essential—form of parallel filament bundles or fabrics. Frequently, only a reinforcement in the lengthwise direction of the glass fleece is made through—essentially—parallel filament bundles.

The reinforcement threads can be used when arranged as meshes, grids or fabrics. Furthermore, reinforcements in the form of webs and multi-axial fabrics are also preferred. More preferred are reinforcements with reinforcement yarns arranged in parallel to each other, thus warp filament bundles, as well as fabrics or meshes.

The thread thickness can vary within wide limits, depending on the desired characteristics profiles. The preferred thread thickness is between 20 and 250 threads per meter. The thread thickness is measured vertically to the thread orientation. The reinforcement threads are preferably introduced before the glass fiber mat is formed on the top side of the circumferential machine screen. However, it is also possible to introduce the threads while the glass fiber mat is formed, so that these will be embedded.

The hybrid base carrier mat (H-BFM) is hardened preferably using a binding agent, in particular a chemical binder. The present chemical binder can be hardened fully or only partially. The binding agent is usually applied onto the freshly formed hybrid fiber mat during or after the manufacturing, before the hybrid fiber mat is dried.

The binder is applied in the process preferably in the form of a watery binding system, which possesses at least one organic binder. The concentration of organic binder(s) in the watery binding system is between 2 and 30 weight-%, preferably between 5 and 16 weight-%, whereas the specification refers to the binding system after complete drying.

The binder concentration in the hybrid base carrier mat (H-BFM) according to the invention is 5 to 40 weight-%, preferably contains 10 to 25 weight-% (relative to the total weight of the dried fiber mat). A fiber mat is considered to be dried when it contains less than 1% residual moisture (weight percentage). This can be achieved in an oven with a temperature of at least 190° C. and a drying time of at least 2 minutes.

The organic binder(s) in the binding system are generally not subject to any restriction, but the binder must be oxidation-resistant. The organic binding agents are chemical binding agents, preferably on the basis of urea, phenol formaldehyde, melamine formaldehyde or mixtures thereof, formaldehyde-free binding agents, self-cross-binding binders, which have a complete chemical reaction without addition of a catalyst. The cross-binding is induced preferably thermally. It has been proven that acrylate binder or other temperature-stable thermoset binders are particularly suited.

Besides the aforementioned organic binders, also inorganic binders can be used. Such inorganic binders can replace the aforementioned organic binders almost entirely or at least in part, i.e. they can be used in mixtures with the aforementioned organic binders. A suitable inorganic binder is, for example, water glass, in particular on a sodium silicate basis. The concentration of inorganic binders is between 0 and 18 weight-%, preferably between 0.5 and 18 weight-%, whereas the specification refers to the binding system after complete drying.

As mentioned above, alternatively or additionally to the electrically conductive fibers, electrically conductive additives or substances increasing the electrically conductivity can be used, which, together with the binder, are introduced into the hybrid base carrier mat (H-BFM) as eclectically conductive components. Besides additives made of inert metals, carbon additives such as electrically conductive grime or graphite, graphene or CNT (carbon nanotubes) are preferred, which are mixed with the binder and added this way to the hybrid fiber mat. The concentration of the carbon additive is 0 to 50 weight-%, preferably 15 to 30 weight-% relative to the used binder and after drying. More preferred are graphites with high electrical conductivity of at least $10^4$ S/m. Graphite or grime with high surface porosity are beneficial for this purpose, i.e. iodine counts of more than 900 are preferred (determined according to ASTM D-1510). Highly conductive carbons are furthermore commercially available, e.g. as Vulcan XCmax 22 of the company Cabot. In the alternative, also ground carbon fibers, e.g. such with a fiber length of up to 250 μm can be used.

The concentration of the binder and the electrically conductive additives in the hybrid base carrier mat (H-BFM) according to the invention is cumulatively 5 to 40 weight-%, preferably 10 to 25 weight-% (relative to the total weight of the dried fiber mat).

The hybrid base carrier mat (H-BFM) according to the invention has a preferable width of 400 μm (without the possibly present MPL), the preferential thickness is max. 300 μm, more preferably max. 200 μm. In addition, the hybrid base carrier mat (H-BFM) has a minimum thickness of preferably 40 μm, more preferably min. 10 μm. The thickness is determined according to DIN EN ISO 9073-2: 1997-02.

The hybrid base carrier mat (H-BFM) according to the invention has a preferred mass per unit area of 5 to 100 g/m$^2$, more preferred 10 to 50 g/m$^2$, whereas the aforementioned weight-% indications relate to the H-BFM after drying.

The air penetrability of the hybrid base carrier mat (H-BFM) according to the invention is at least 1000 I/m$^2$ sec, preferably at least 2000 I/m$^2$ sec (according to DIN EN ISO 9237: 1995-12).

The surface resistance of the hybrid base carrier mat (H-BFM) according to the invention has a surface resistance between 2 ohm and 250 ohm, preferably between 5 ohm and 150 ohm. The electrical conductivity in perpendicular to the surface is at least 1 S/m, preferably 10 S/m to 100 S/m.

High Porous Conductive Impregnation (HPCI)

The hybrid base carrier mat (H-BFM) contained in the gas diffusion layer (GDL) according to the invention has a high-porous conductive impregnation (H PCI), whereby a very good electrical conductivity is reached and, furthermore, a homogeneous gas flow over the surface is enabled. In addition, the accumulating water is drained effectively.

The high-porous conductive impregnation (HPCI) according to the invention enables in particular a very good electrical as well as thermal conductivity in the Z-direction (perpendicular to the hybrid base carrier fiber mat surface). The high-porous structure allows for a high permeability by water, water vapor and the operating gases. By addition of suitable hydrophobization agents, casting out the water is supported additionally.

Surprisingly, it has been shown that the conductivity and porosity of the high-porous conductive impregnation (HPCI) are particularly suited to achieve a good balance between electrical conductivity, mass transport and affordable manufacturing.

The high-porous conductive impregnation (HPCI) according to the invention comprises
  i) at least one electrically conductive material,
  ii) at least one hydrophobization agent or at least one hydrophobization biding agent,
characterized in that
  iii) the electrically conductive material has an electrical conductivity,
  iv) the hydrophobization agent or the hydrophobization binder is a fluorinated polymer or paraffin,
  v) the impregnation contains 1 to 30 weight-%, preferably 2 to 20 weight-% hydrophobization agent(s) and chemical binder, wherein the weight ratio between the hydrophobization agent(s) and chemical binder is between 1:10 and 1:1, preferably between 1:9 and 1:1, and wherein the aforementioned weight percentages refer to the impregnation mass after drying, or the impregnation has 1 to 30 weight-%, preferably 2 to 20 weight-% hydrophobization agent(s), wherein the aforementioned weight percentages refer to the impregnation mass after drying, The application quantity of the high-porous conductive impregnation on the hybrid base carrier mat (H-BFM) is 10 to 250 g/m$^2$, preferably 60 to 150 g/m$^2$, in reference to the entire coating mass after drying.

The high-porous conductive impregnation (HPCI) according to the invention comprises 70 to 99.9 weight-% electrically conductive material, wherein the aforementioned weight percentages refer to the impregnation mass after drying. A particle-shaped material means the electrically conductive material with an electrical conductivity of min. 100 S/m. The preferred materials are selected from the group of grimes (carbon black), graphites and/or mixtures of the same. Also suitable metallic materials can be used. The particle-shaped, electrically conductive material preferably has a spherical geometry, wherein the median diameter is max. 150 μm or the particle-shaped, electrically conductive material has a mostly fibrous or rod-shaped structure with a maximum length of 250 μm. Moreover, mixtures of (a) spherical and (b) fibrous or rod-shaped structures can be present.

The high-porous conductive impregnation (HPCI) according to the invention comprises 0.1 to 15 weight-%, preferably 0.2 to 10 weight-% hydrophobization agent electrically conductive material, wherein the aforementioned weight percentages refer to the impregnation mass after drying.

Preferred hydrophobization agents are fluorinated polymer and/or paraffins. Suitable hydrophobization agents are, for example, Sequapel 409 (paraffin of the company Omnova Solution) or Repellan 5033 (company Pulcra Chemical).

Besides this, the high-porous conductive impregnation according to the invention also contains, besides the said hydrophobization agent, 0.5 to 27 weight-%, preferably 1 to 18 weight-% chemical binder, wherein the aforementioned weight percentages refer to the impregnation mass after drying. Preferable chemical binding agents are polyacrylate melamine formaldehyde, PET and/or similar binders.

In a preferable embodiment, the chemical binder differs in its chemical nature from the aforementioned hydrophobization agent.

In a more preferable embodiment, the hydrophobization agent also functions as chemical binder, i.e. a separate binder is not required anymore in the high-porous conductive impregnation. This type of bi-functional agents are referred to as hydrophobization binders. By elimination of a separate chemical binder, also advantages result in terms of the electrical conductivity, besides a simplification of the manufacturing process. Suitable hydrophobization binders are PTFE dispersions (company 3M Dyneon).

The high-porous conductive impregnation (HPCI) according to the invention can furthermore also comprise micro glass fibers with a diameter of 0.2 to 5 µm and/or silica fillers with a particle size between 2 and 10 µm, wherein the concentration of the aforementioned materials is 0 to 20 weight-%, preferably 0.1 to 10 weight-%, more preferably 0.2 to 5 weight-%, wherein the aforementioned weight percentages refer to the impregnation mass after drying. By using the aforementioned materials, the pore volume of the gas diffusion layer—with simultaneously low thickness—can be influenced beneficially.

For better preparation, the high-porous conductive impregnation (HPCI) according to the invention can furthermore also comprise other additives in cumulated concentrations of up to 5 weight-%, wherein the aforementioned weight percentages refer to the impregnation mass after drying. Additives are common dispersion agents, surfactants or coupling agents known to the person skilled in the art.

The high-porous conductive impregnation according to the invention is applied as a watery solution or dispersion onto the hybrid base carrier mat (H-BFM). The required viscosity of the impregnation mass is dependent on the used application method and it can be adjusted by means of the water concentration in the impregnation mass.

It is beneficial for the efficient function of the system that the impregnation mass is distributed as homogeneously as possible on the surface, especially also perpendicular to the fiber mat.

In a further embodiment of the invention, a carbon paper can be applied additionally on top of the high-porous conductive impregnation according to the invention, which forms a so-called micro-porous layer (MPL). Such carbon papers are commercially available.

Micro-Porous Layer (MPL)

In a further embodiment of the invention, an optional micro-porous layer (MPL) can be applied on one side, which faces the catalyst in the membrane electrode unit (MEU), on the gas diffusion layer (GDL) according to the invention. This micro-porous layer (MPL) forms a part of the GDL and it is applied on it. The micro-porous layer (MPL) is therefore in between the catalyst layer and the actual gas diffusion layer (GDL).

The micro-porous layer (MPL) preferably comprises a carbon paper. The carbon paper is present as an extensively structure already. The carbon paper can be applied in different ways on the hybrid base carrier fiber mat. It is preferred if the carbon paper is applied on the hybrid base carrier fiber mat, having been freshly impregnated with the high-porous conductive impregnation but which has not dried yet. For this, pressing down the carbon paper lightly onto the hybrid base carrier fiber mat by means of draw rolling has been proven to be beneficial. The impregnated hybrid base carrier fiber mat is then dried together with the carbon paper in an oven without further contact pressure.

Alternatively, the carbon paper can also be applied on the gas diffusion layer (GDL) according to the invention by means of an additional binder. In these cases, it is necessary to first apply a binder onto the dried GDL. The binder is applied using known methods. The binder quantity should not exceed 5 weight-% in reference to the mass per unit area of the carbon paper. Alternatively, the binder can also be applied onto the carbon paper instead of the GDL. The carbon paper is applied onto the GDL after this. It has been proven beneficial to attach the carbon paper on the GDL by means of a draw roll with very slight contact pressure. The drying takes place in an oven after this.

Catalyst Layer (CAT-L)

In a further embodiment of the invention, the gas diffusion layer (GDL) according to the invention, which is equipped with the micro-porous layer (MPL) described above, can additionally have a catalyst layer (CAT-L). The micro-porous layer (MPL) forms a part of the gas diffusion layer (GDL) and is therefore arranged in between the catalyst layer (CAT-L) and the actual gas diffusion layer (GDL). Such an arrangement is also referred to as a gas diffusion electrode (GDE). The catalyst layer (CAT-L) can be applied using known methods such as pressing, sputtering, coating, cutting out of the vacuum (vapor deposition) or by means of separation supported by ion beams (IBAD Ion Beam Assisted Deposition or Dual-IBAD).

The catalyst layer (CAT-L) contains at least one precious metal of the platinum group, in particular Pt, Pd, Ir, Rh, Os, Ru, and/or at least one precious metal Au and/or Ag or the catalyst layer is formed from (i) at least one precious metal of the platinum group, in particular Pt, Pd, Ir, Rh, Os, Ru, and/or at least one precious metal Au and/or Ag and (ii) at least a metal with lower potential according to the electrochemical series than the metal named under (i), in particular, selected from the group Fe, Co, Ni, Cr, Mn, Zr, Ti, Ga, V. The catalyst is preferably embodied in the form of an alloy of metals (i) and (ii). In addition to the alloy, further catalytically active substances, in particular precious metal of the platinum group, in particular Pt, Pd, Ir, Rh, Os, Ru or also the precious metals Au and/or Ag can be used. In addition, the oxides of the aforementioned precious metals and/or non-precious metals can be used. The catalytically active particles, comprising the aforementioned substances, can be used in the form of metal powder, so-called black precious metal, in particular platinum and/or platinum alloys. Such particles generally have a size in the range from 5 nm to 200 nm, preferably in the range from 7 nm to 100 nm. In addition, the metals can also be used on a carrier material. This carrier preferably comprises carbon, which can be used in particular in the form of grime, graphite of graphitized carbon black. Furthermore, also electrically conductive metal oxides such as $SnO_x$, $TiO_x$, or phosphates such as $FePO_x$, $NbPO_x$, $Zr_y(PO_x)_z$ can be used as carrier material. The indices x, y and z denote the oxygen or metal content of the individual bonds here, which can be in a known range, as the transition metals can enter different oxidation stages. The concentration of these supported metal particles relative to the total weight of the metal carrier bond is generally in the range from 1 to 80 weight-%. The particle size of the carrier, in particular the size of the carbon particles is preferably in the range from 20 to 100 nm. The size of the metal particles on is preferably within the range from 1 to 20 nm.

The catalyst layer usually has a thickness within the range of 0.1 to 50 μm.

The catalyst layer usually has a load of catalysts between 0.1 and 20 $g/m^2$.

To achieve a better connection of the gas diffusion electrode (GDE) described above on the polymer electrolyte membrane, additional ionomer material can be applied on the catalyst layer (CAT-L), for example, by means of spraying. This type of ionomer materials, for example, on the basis of Nafion®, are described in the prior art. The ionomer material is usually selected from the same material or a material compatible with the polymer electrolyte membrane. The applied ionomer material, however, can also act itself as polymer electrolyte membrane.

Within the scope of the present invention, modified polymers on the basis of sulfonic acid groups are preferred as ionomer materials. More preferred for this are ionomer materials made of sulfonic acid-modified polymers and/or sulfonated polysulfone, sulfonated polyether sulfone, sulfonated polyether ketone, and their mixtures.

Besides the presently common hydrogen fuel cells, also fuel cells are known that use fuels on a methanol or formic acid basis. In the latter, it has been shown that instead of the precious metal catalysts, ruthenium complexes are suitable as catalysts, for example, ruthenium phosphane or ruthenium diphosphane catalysts ($RuCl_2(PPh_3)_2$).

Production

The gas diffusion layer according to the invention is produced in a two-stage process. In the first step, initially the hybrid base carrier mat (H-BFM) is made and then the HPCI coating is applied on the H-BFM.

The hybrid base carrier mat (H-BFM) contained in the gas diffusion layer (GDL) according to the invention is produced by means of known fiber mat formation methods. The production of fiber mats, in particular wet-laid fiber mats has been known for more than 50 years and it uses the methods and machinery originally developed for the production of paper. Within the scope of the present invention, wet-laid fiber mats are preferred for their very good homogeneity.

To produce wet-laid fiber mats such as glass fiber mats, the glass fibers are dispersed in water in a so-called pulper with the portion of glass fibers being approx. 0.1 to 1 weight-%. It must be ensured in the process that the glass fibers are damaged as little as possible during the dispersion, i.e. that essentially no fractions of the fibers occur. The dispersed glass fibers are stored for the interim in one or more storage tanks. The discharge takes place through the material outlet, wherein the concentration of glass fibers is reduced by a factor of 10 to 20. The discharge takes place on a circumferential machine screen, through which the water is extracted and the wet-laid glass fiber mat is formed. The drained water is returned to the process, i.e. it is recycled. Subsequently, the newly formed glass fiber mat is applied on a binder, which causes the glass fiber mat to solidify after the drying or hardening, so that it can be rolled up and processed further, respectively.

The production of wet-laid hybrid fiber mats of glass and carbon fibers or conductive polymer fibers is done in a similar manner as for glass fiber mats, meanwhile both fiber types are mixed with each other before being discharged on the machine screen.

The hybrid base carrier mat (H-BFM) may have a further reinforcement in addition. The addition of extensively reinforcements is typically done on the top side of the circumferential machine screen on which the wet-laid BFM is formed. The reinforcement threads and/or yarns are added in an analogous manner as adding the extensively reinforcement or they are added individually, i.e. from the top or the side, wherein the reinforcement threads and/or yarns are integrated in the middle of the formed fiber mat or on the top and/or bottom side. The integration position results from the exact place of the addition in the area where the mat is formed on the machine screen. Ultimately, restrictions result merely from the design of the fiber mat shaper that is used.

A binder is applied on the newly formed wet-laid hybrid base carrier mat (H-BFM), which will effect a solidification of the hybrid fiber mat after the drying or hardening in an oven. Excess binder can be extracted through the machine screen so that the binder system is provided evenly distributed.

The hybrid base carrier mat (H-BFM) can then be placed in an oven. The hybrid base carrier mat (H-BFM) dried and solidified this way is then rolled up and processed further at a later time.

Alternatively, the hybrid base carrier mat (H-BFM) on which binder has been applied can be impregnated with the HPCI coating mass without drying in direct subsequence in an in-line process. The drying then follows only after the HPCI impregnation.

After the hybrid base carrier mat (H-BFM) is produced, it is coated with the HPCI material directly afterwards (in-line) or separately in a second step (offline). All common methods are suitable and can be used for impregnation, in particular scrapers, air knives, applicator rolls, slotted nozzles, curtain coating or the Foulard technique. It is beneficial if the coating mass of the BFM soaks through completely (impregnation). A partly and inhomogeneous impregnation over the surface and, in particular, also perpendicular to the fiber mat surface, should be avoided.

The required viscosity of the impregnation mass is dependent on the used application method and it will be adjusted by means of the water concentration in the impregnation mass.

Besides the mentioned methods, also reverse coating, screen printing, or 2D printing are possible as alternative coating methods.

The high-porous conductive impregnation (HPCI) can be applied onto the hybrid base carrier mat (H-BFM) by means of simple application or in several application steps, wherein the composition and/or concentration of the impregnation can vary in case of multiple application. In addition, different application methods can also be combined for the application of the high-porous conductive impregnation. After completion of the impregnation, the impregnated BFM undergoes a drying step in an oven.

If a carbon paper is to be present as a micro-porous layer (MPL), it is applied on one outer side. The carbon paper is present as an extensively structure already.

The carbon paper can be applied in different ways on the hybrid base carrier fiber mat (H-BFM). It is preferred if the carbon paper is applied on the hybrid base carrier fiber mat, having been freshly impregnated with the HPC but which has not dried yet. For this, pressing down the carbon paper lightly onto the BFM by means of draw rolling has been proven to be beneficial. The impregnated BFM is then dried together with the carbon paper in an oven without further contact pressure.

Alternatively, the carbon paper can also be applied onto the dried, impregnated hybrid base carrier mat (H-BFM). In these cases, it is necessary to first apply a binder onto the dried, impregnated hybrid base carrier mat (H-BFM). The binder is applied on the hybrid base carrier mat (H-BFM) using the customary methods. The binder quantity should not exceed 5 weight-% in reference to the mass per unit area of the carbon paper. Alternatively, the binder can also be applied onto the carbon paper instead of on the base carrier mat (H-BFM). Finally, the carbon paper is applied onto the dried, impregnated hybrid base carrier mat (H-BFM). It has been proven to be beneficial to attach the carbon paper on the impregnated hybrid base carrier mat (H-BFM) by means of a draw roll with very slight contact pressure. The drying takes place in an oven after this.

The hybrid gas diffusion layer according to the invention is used for the manufacturing of membrane electrode units (MEU) for in polymer electrolyte membrane (PEM) fuel cells. Membrane electrode units (MEU) of this kind are referred to as single cells with bipolar plates with several single cells commonly being arranged as stacks forming a fuel cell system. Polymer electrolyte membrane (PEM) fuel cells of this kind are used in mobile and/or stationary systems.

Further important possible uses of the hybrid gas diffusion layer according to the invention are the elements corresponding to the fuel cell in electrolysis units. In addition, there are possibilities for using the hybrid gas diffusion layer according to the invention in redox flow battery systems. A redox flow battery system is a special embodiment of an accumulator in which two energy-storing electrolytes circulate in two separate circuits. The ion exchange between the electrolytes takes place in the galvanized cell by means of an ion exchange membrane.

As mentioned above, the hybrid gas diffusion layer according to the invention is used in the manufacturing of membrane electrode units (MEU) for polymer electrolyte membrane (PEM) fuel cells. For this purpose, the hybrid gas diffusion layer according to the invention is combined or laminated with a proton-conducting polymer electrolyte membrane, if it has not already been applied on the catalyst layer. The polymer electrolyte membrane to be used is not subject to any general restriction so that any polymer electrolyte membrane (PEM) is suitable on principle.

Within the scope of the present invention, however, modified polymers on the basis of sulfonic acid groups are preferred as PEM. More preferred for this are PEM made of sulfonic acid-modified polymers and/or sulfonated polysulfone, sulfonated polyether sulfone, sulfonated polyether ketone, and their mixtures. Most preferred are so-called catalyst coated membranes (CCM), i.e. polymer electrolyte membranes (PEM), which already have a catalyst layer. This catalyst layer contacts the hybrid gas diffusion layer according to the invention.

The invention is explained in more detail by means of examples and comparisons, without thereby intending any limitation of novelty.

EXAMPLES

The invention is explained in more detail by means of the following examples:

A hybrid base carrier mat (H-BFM) is manufactured by mixing glass fibers and carbon fibers at a ratio of 70/30 weight-% in circulation water and placed onto the delivery belt under standard conditions in a wet-laying procedure. In the process, glass fibers with a diameter of 10µ and a length of 12 mm are used. If carbon fibers are added, these are procured under the product names used by the company SGL TECHNOLOGIES GmbH in Meitingen. The target diameter of the carbon fibers was 7µ and the target length 12 mm.

The binding agent can also contain conductive particles. In these cases, a grime dispersion was added to the binder, which is commercially available under the name 2143 Carbofin.

As a counter example, a fiber mat was produced without addition of carbon fiber mats or conductive particles in the binder.

In all examples, the target mass per unit area was 20 g/m$^2$.

The high-porous conductive impregnation (HPCI) is applied onto the H-BFM by means of scrapers.

A series of different H-BFM is manufactured by means of the standard wet-laying methods described above. The respective compositions are shown in Table 1, the binding agents used are commercially available as melamine formaldehyde binder and acrylate binders.

Using a scraper, the high-porous conductive impregnation is then applied onto the H-BFM, which has been produced as described above. The results achieved are shown in Table 2. In all examples, the HPCI contained 89.9% electrically conductive material, 0.9% hydrophobization agent and 9% chemical binding agent (in weight percent). The conductive components are carbon dispersions (e.g. MECHANO-COND® 1D4 of the company H.C. Carbon). Hydrophobization binders are PTFE dispersions (e.g. Dyneon TF 5060 GZ).

TABLE 1

| H-BFM Example | GF/LF | Binder | Conductive material [wt.-%] | Mass per unit area [g/m$^2$] | Thickness [mm] | Air permeability [l/m$^2$sec] | Fl.-resistance [ohm] |
|---|---|---|---|---|---|---|---|
| B3 | 70/30 | Melamine formaldehyde 25% | Grime 26.2 | 19.4 | 0.21 | 3,940 | 24.3 ohm |
| B4 | 100/0 | Acrylate 26% | Grime 30.7 | 20.7 | 0.22 | 4,876 | 72.0 ohm |
| B5 Counter example | 100/0 | Acrylate 100% | 0% | 20.5 | 0.20 | 4,100 | >1 Mohm |

GF Glass fiber, content in weight percent
LF Electrically conductive fibers, content in weight percent

TABLE 2

| CDL Example | H-BFM | Application [g/m$^2$] | Mass per unit area CDL [g/m$^2$] | Air permeability [l/m$^2$sec] | Gurley [sec] | Electrical conductivity S/m |
|---|---|---|---|---|---|---|
| G1 | B3 | 62.6 | 82 | 46 | 0 | 468 |
| G2 | B3 | 124.6 | 144 | 20 | 0 | 581 |
| G3 | B4 | 119.3 | 140 | 27 | 0 | 421 |
| G4 | B4 | 142.3 | 163 | 0 | 5 | 665 |

LM Electrically conductive material, indication in weight percent
HM Hydrophobization agent, indication in weight percent
CM Chemical binding agent, indication in weight percent Measuring Methods The measuring methods quoted in this description are based on the following measuring regulations:

Determination of the Mass Per Unit Area:
 DIN EN ISO 29073-1 (1992-08).

Determination of the Fiber Diameter:
 DIN EN ISO 1973 (1995-12).

Measurement of the Fiber Mat Thickness:
 DIN EN ISO 9073-2 (1997-02)

Determination of the Young Module:
 ASTM E111-04 (2010) DOI: 10.1520/E0111-04R10; publication date (2010).

Measurement of Air Permeability:
 DIN EN ISO 9237 (1995-12)

Measurement of Conductivity:

Conductivity is determined perpendicular to the fiber mat surface by measuring the electrical resistance during current flow through a sample with defined electrode surface. The conductivity (Siemens/meter) is then obtained in consideration of the fiber mat thickness. The measurement is taken at room temperature (23° C.) and with application of a force of 350 Newton on the measuring electrodes and a current flow set at 2 ampere. The electrode surface was 2.25 cm$^2$.

Determination of the Surface Resistivity:

The surface resistivity (ohm) in parallel to the fiber mat surface can be determined by means of a simple two-point method. For this purpose, two electrodes are applied onto the fiber mat surface under defined conditions and the resistance between the measuring electrodes. The surface resistivity is measured on samples with a sample width of 10 cm and a sample length of 10 cm. Each of the electrodes had a surface size of 10 cm$^2$ and were applied onto the fiber mat surface by means of force of 8.25 N.

Measurement of the Water Repellency:
 Water Repellency Test II (Water/Alcohol Drop Test); 3M from May 1992

Gurley:

Porosity according to Gurley is measured pursuant to ISO 5636-1 (1984). For uneven surfaces, a rubber ring (O-ring) is used for sealing.

The invention claimed is:

1. A gas diffusion layer (GDL), comprising
 (i) a base carrier fiber mat (BFM),
 characterized in that
 (ii) the base carrier fiber mat (BFM) is a hybrid base carrier mat (H-BFM), and
 (iii) the aforementioned hybrid base carrier mat (H-BFM) is provided with a high-porous conductive impregnation (HPCI), and
 (iv) the aforementioned impregnated hybrid base carrier mat (H-BFM) optionally contains an additional microporous layer (MPL), and
 wherein the hybrid base carrier mat (H-BFM) contains 5 to 70 weight-% electrically conductive fibers and 95 to 30 weight-% electrically non-conductive fibers, based upon the weight of fibers present in the hybrid base carrier mat (H-BFM).

2. The gas diffusion layer according to claim 1, characterized in that the hybrid base carrier mat is a mat with at least one electrically conductive and at least one electrically non-conductive component, wherein the electrical conductive component optionally comprises electrical conductive fibers, electrical conductive additives or mixtures of electrical conductive fibers and electrical conductive additives.

3. The gas diffusion layer according to claim 2, characterized in that the electrically non-conductive component comprises electrical non-conductive fibers, the electrical non-conductive fibers optionally comprising glass fibers, ceramic fibers and/or mineral fibers or also mixtures of the same, and/or the electrical non-conductive component comprises electrically non-conductive organic fibers, preferably polymer fibers or mixtures of organic and inorganic fibers.

4. The gas diffusion layer according to claim 3, characterized in that the electrically non-conductive fibers are inorganic fibers comprising mineral fibers or glass fibers with lengths between 5 and 18 mm.

5. The gas diffusion layer according to claim 3, characterized in that the electrically non-conductive fibers are inorganic fibers the inorganic fibers optionally comprising mineral fibers or glass fibers with average fiber diameters between 5 and 30 μm.

6. The gas diffusion layer according to claim 2, characterized in that the electrical non-conductive component comprises electrically non-conductive glass fibers consisting of A-glass, E-glass, S-glass, C-glass, T-glass or R-glass.

7. The gas diffusion layer according to claim 2, characterized in that the electrical conductive component comprises electrical conductive fibers of graphite or carbon with a diameter of 4 to 20 μm, further also comprising electrical conductive fibers as well as electrically conductive fibers of metals.

8. The gas diffusion layer according to claim 1, characterized in that the hybrid base carrier mat (H-BFM) is solidified with a binding agent, the binding agent optionally comprising a chemical binder, wherein the chemical binder comprises at least one organic binding agent.

9. The gas diffusion layer according to claim 8, characterized in that the content of binder in the hybrid base carrier mat (H-BFM) is 5 to 40 weight % binding agent.

10. The gas diffusion layer according to claim 8, characterized in that the binder comprises electrical conductive additives the electrical conductive additives optionally comprising electrical conductive grime or graphite, graphene or CNT (carbon nanotubes), wherein the concentration of the binding agent and the electrical conductive additives in the hybrid base carrier mat (H-BFM) cumulatively amounts to 5 to 40 weight %.

11. The gas diffusion layer according to claim 1, characterized in that the hybrid base carrier mat (H-BFM) has a thickness of max. 400 μm.

12. The gas diffusion layer according to claim 1, characterized in that the hybrid base carrier mat (H-BFM) has a mass per unit area of 5 to 100 g/m$^2$.

13. The gas diffusion layer according to claim 1, characterized in that the hybrid base carrier mat (H-BFM) has an air permeability of at least 1000 l/sec.

14. The gas diffusion layer according to claim 1, characterized in that the hybrid base carrier mat (H-BFM) has a surface resistivity between 2 Ohm and 250 Ohm.

15. The gas diffusion layer according to claim 1, characterized in that the hybrid base carrier mat (H-BFM) has an electrical conductivity perpendicular to the surface of at least 1 S/m.

16. The gas diffusion layer according to claim 1, characterized in that the high-porous conductive impregnation (HPCI) comprises (i) at least one electrically conductive material, and (ii) at least one hydrophobization agent or at least one hydrophobization binder, and (iii) the electrically conductive material has an electrical conductivity, and (iv) the hydrophobization agent or the hydrophobization binder is a fluorinated polymer or paraffin, and
 (v) the impregnation contains 1 to 30 weight % hydrophobization agent(s) and chemical binder, wherein the weight ratio between the hydrophobization agent(s)

and chemical binder is between 1:10 and 1:1, and wherein the aforementioned weight percentages refer to the impregnation mass after drying, or the impregnation has 1 to 30 weight % hydrophobization agent(s), wherein the aforementioned weight percentages refer to the impregnation mass after drying.

17. The gas diffusion layer according to claim 1, characterized in that the application quantity of the high-porous conductive impregnation on the hybrid base carrier mat (H-BFM) is 10 to 250 g/m$^2$ in reference to the entire coating mass after drying.

18. The gas diffusion layer according to claim 1, characterized in that the high-porous conductive impregnation comprises 70 to 99.9 weight-% electrical conductive material, wherein the aforementioned weight percentages refer to the impregnation mass after drying.

19. The gas diffusion layer according to claim 1, characterized in that a carbon paper is applied on the high-porous conductive impregnation in addition.

20. The gas diffusion layer according to claim 19, characterized in that the carbon paper has an additional catalyst layer, wherein an ionomer material is applied over the additional catalyst layer.

21. An electrochemical cell comprising the gas diffusion layer according to claim 1 optionally wherein the electrochemical cell is an electrolyzer cell, or a membrane electrode unit of a fuel cell, or a redox flow cell.

22. The electrochemical cell according to claim 21, characterized in that the membrane electrode unit comprises polymer electrolyte membranes of polymers modified based on sulfonic acid groups, optionally wherein the polymer electrolyte membrane comprises a catalyst layer, wherein the catalyst layer contacts the gas diffusion layer or a carbon paper.

23. An electrochemical cell, which is optionally a membrane electrode unit for fuel cells, comprising (i) a gas diffusion layer on the anode side, and (ii) a gas diffusion layer on the cathode side, and (iii) a polymer electrolyte membrane arranged between the two gas diffusion layers consisting of polymers modified based on sulfonic acid groups, having at least one catalyst layer contacting the gas diffusion layer or a carbon paper, characterized in that at least one gas diffusion layer of the gas diffusion layer on the anode side and the gas diffusion layer on the cathode side is a gas diffusion layer according to claim 1.

24. A gas diffusion layer (GDL), comprising
(i) a base carrier fiber mat (BFM),
characterized in that
(ii) the base carrier fiber mat (BFM) is a hybrid base carrier mat (H-BFM), and
(iii) the hybrid base carrier mat (H-BFM) is provided with a high-porous conductive impregnation (HPCI), and
(iv) the impregnated hybrid base carrier mat (H-BFM) optionally contains an additional microporous layer (MPL), and
wherein the hybrid base carrier mat (H-BFM) has a surface resistivity between 2 Ohm and 250 Ohm.

* * * * *